United States Patent
Xiao et al.

(10) Patent No.: US 12,082,091 B1
(45) Date of Patent: Sep. 3, 2024

(54) UNCERTAINTY BASED SELECTION FOR LOCATION REPORTING IN E911 SYSTEMS

(71) Applicant: T-Mobile Innovations LLC, Overland Park, KS (US)

(72) Inventors: Nan Xiao, Mercer Island, WA (US); Wei-Ming Lan, Morrisville, NC (US)

(73) Assignee: T-Mobile Innovations LLC, Overland Park, KS (US)

( * ) Notice: Subject to any disclaimer, the term of this patent is extended or adjusted under 35 U.S.C. 154(b) by 413 days.

(21) Appl. No.: 17/490,838

(22) Filed: Sep. 30, 2021

(51) Int. Cl.
*H04W 4/90* (2018.01)
*H04W 4/029* (2018.01)

(52) U.S. Cl.
CPC .............. *H04W 4/90* (2018.02); *H04W 4/029* (2018.02)

(58) Field of Classification Search
CPC .................................. H04W 4/029; H04W 4/90
USPC ......................................................... 455/404.2
See application file for complete search history.

(56) References Cited

U.S. PATENT DOCUMENTS

| 2007/0155401 A1* | 7/2007 | Ward | H04W 8/08 455/456.1 |
| 2019/0253861 A1* | 8/2019 | Horelik | H04W 64/006 |

\* cited by examiner

*Primary Examiner* — Ted M Wang
(74) *Attorney, Agent, or Firm* — Shook, Hardy & Bacon L.L.P.

(57) ABSTRACT

Systems, methods, and computer-readable media herein generate an E911 location report based on a vertical uncertainty and horizontal uncertainty associated with a device-based hybrid (DBH) location and an assisted global positioning system (A-GPS) location received from a UE device. The uncertainties may be compared determine which portions of the DBH location and the A-GPS location to include in a location report sent to a PSAP. A location report including the location information associated with the lower uncertainty can be sent to a PSAP, thus providing the most relevant and accurate information so that first responders can more effectively locate a distressed caller.

20 Claims, 8 Drawing Sheets

UNCERTAINTY BASED SELECTION FOR LOCATION REPORTING IN E911 SYSTEMS

BACKGROUND

Enhanced 911 ("E911") is a vital part of the emergency response system. Upon a distressed caller placing an emergency call via user equipment ("UE"), E911 is able to critically provide the estimated physical location of the caller. This physical location is often provided to a Public Safety Answering Point ("PSAP"), such as an operator who receives 911 calls and dispatches first responders to the scene. E911 is in contrast to traditional 911 services where a caller has to orally provide the operator with location information. In E911, various types of positioning technologies can be used to derive geographical location information for a UE, which can then be provided to a PSAP. For example, location information for a UE can be provided in the form of a Device Based Hybrid ("DBH") location and/or an Assisted Global Positioning System ("A-GPS") location. DBH is a positioning solution that uses a combination of technologies, such as satellite Global Positioning System ("GPS") and crowd-sourced Wi-Fi measurements to produce high-accuracy location information. This technology is particularly suited for UEs located indoors. A-GPS is a positioning technology that uses a global navigation satellite system to determine an estimated position of a device. The A-GPS system assists in determining a position fix for a device based on using one or more data networks to provide the orbital information associated with the global positioning satellites. Since the A-GPS system uses a data network to determine orbital information associated with one or more global positioning satellites-instead of acquiring the information from the satellites directly from the satellites—A-GPS enables improved performance and a reduced duration for determining a device's position compared to a stand-alone GPS system.

An uncertainty value may be associated with location information generated using DBH positional technologies and/or A-GPS. An uncertainty value represents an estimate of the amount of potential positional error associated with an estimated location or coordinates. In particular, the location information generated using DBH technologies and/or A-GPS technologies may include an uncertainty value associated with a horizontal component or latitude/longitude components (e.g., a horizontal uncertainty) of a location. Horizontal uncertainty is a location parameter that may indicate the outer boundary of the possible radius of a search area surrounding the estimated location coordinates for a UE, such as the estimated coordinates obtained from a DBH or A-GPS location. Horizontal uncertainty is a distance or region that is expressed in meters and is often expressed as a circle or an ellipse. The lower the horizontal uncertainty, the smaller the potential search area and the higher the likelihood that a caller will be located. Further, the location information generated using DBH technologies and/or A-GPS technologies may include an uncertainty value associated with a vertical component or altitude components (e.g., a vertical uncertainty) of a location. Vertical uncertainty is a location parameter that may indicate the outer boundary of an altitude range of a search area surrounding the estimated location for a UE, such as the estimated altitude coordinates obtained from a DBH or A-GPS location. Vertical uncertainty is a distance or altitude that is expressed in meters. As with the horizontal uncertainty, the lower the vertical uncertainty, the smaller the potential search area and the higher the likelihood that a caller will be located.

In conventional E911 methods and systems, if transmission of a UE's location to a cellular network is successful, the location is used in generating a location report for the UE that is sent to a PSAP. In some scenarios, both a location derived from DBH technologies and a location derived from A-GPS technologies associated with a UE may be transmitted as part of the location report. The inclusion of an A-GPS location and a DBH location may provide an enhanced ability to locate a distressed caller associated with the UE, as the search area maybe further defined based on the additional information provided by both location technologies. However, each of the A-GPS location and the DBH location may be associated with horizontal and vertical uncertainty values. In some situations, the uncertainty values associated with the A-GPS location may vary from the uncertainty values associated with the DBH location which can have significant detrimental consequences because it may obfuscate or be misinforming of the potential area in which a caller may be located, thereby making it more difficult for first responders to quickly find a distressed caller. In such a scenario, where the DBH uncertainty values vary significantly from the A-GPS uncertainty values, providing a location report including the estimated location of a UE using both location methods may further disrupt or mislead first responders in their efforts to find the distressed caller, as the location report may present seemingly conflicting information as to the potential location of the caller.

SUMMARY

The present disclosure is directed, in part, to uncertainty based selection for location reporting in E911 systems, substantially as shown in and/or described in connection with at least one of the figures, and as set forth more completely in the claims. In contrast to conventional approaches, upon transmission of a UE's DBH location and A-GPS location to a cellular network, the uncertainty values associated with the DBH location and the A-GPS location are taken into account when generating a location report. Depending on the uncertainty values, alternative location information (e.g., contents of a location report) may be transmitted to a PSAP. For example, in certain embodiments, horizontal coordinates and/or vertical coordinates associated with the UE can be transmitted based on the uncertainty values associated with the DBH location and the A-GPS location. For example, the horizontal coordinates from the DBH location may be included in a location report along with the vertical coordinates from the A-GPS location based on the respective uncertainty values. The horizontal coordinates included in the location report may be selected based on comparing the DBH horizontal uncertainty value to the A-GPS horizontal uncertainty value and selecting the horizontal coordinates based on the lower uncertainty value. Similarly, the vertical coordinates included in the location report may be selected based on comparing the DBH vertical uncertainty value to the A-GPS vertical uncertainty value and selecting the vertical coordinates based on the lower uncertainty value. In this way, a more accurate location report may be generated such that the potential area in which a caller may be located is reduced, making it more likely that first responders will be able to quickly locate the distressed caller.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, which are intended to be exemplary and non-limiting, wherein.

DETAILED DESCRIPTION

The subject matter of embodiments of the invention is described with specificity herein to meet statutory requirements. However, the description itself is not intended to limit the scope of this patent. The claimed subject matter might be embodied in other ways to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention.

Further, various technical terms are used throughout this description. A definition of such terms can be found in, for example, Newton's Telecom Dictionary by H. Newton, 31st Edition (2018). These definitions are intended to provide a clearer understanding of the ideas disclosed herein but are not intended to limit the scope of the present invention. The definitions and terms should be interpreted broadly and liberally to the extent allowed by the meaning of the words offered in the above-cited reference.

Embodiments of the technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media includes volatile and/or non-volatile media, removable and non-removable media, and contemplate media readable by a database, a switch, and various other network devices. Network switches, routers, and related components are conventional in nature, as are means of communicating with the same. By way of example and not limitation, computer-readable media comprise computer storage media and/or communications media. Computer storage media, or machine-readable media, include media implemented in any method or technology for storing information. Examples of stored information include computer-useable instructions, data structures, program modules, and other data representations. Computer storage media include RAM, ROM, EEPROM, flash memory or other memory technology, CD-ROM, digital versatile discs (DVDs), holographic media or other optical disc storage, magnetic cassettes, magnetic tape, magnetic disc storage, and/or other magnetic storage devices. These memory components can store data momentarily, temporarily, or permanently. Computer storage media does not encompass a transitory signal, in embodiments of the present invention.

Communications media typically store computer-useable instructions, including data structures and program modules, in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

At a high level, systems, methods, and computer-readable media of the present invention generate a location report in response to a communication initiated by a UE based on the uncertainty values associated with a DBH location and an A-GPS location. The systems, methods, and computer-readable media disclosed herein may provide a more accurate, concise, and specific location reports to be generated for use by first responders to an emergency call. By basing the location report contents on the accuracy and/or uncertainty of location values from a UE device, only location information that is relevant and the most accurate may be included in the location report. For example, a UE device may provide a DBH location with a horizontal uncertainty value indicating 15 meters and an A-GPS location with a horizontal uncertainty value of 30 meters. In such an example, where the DBH location has a lower uncertainty value, the location report may be generated such that only the horizontal component of the DBH location (e.g., latitude, longitude, etc.) is included, since the DBH location may be more useful to emergency responders searching a particular area. As another example, a location report may be generated that includes a location with a horizontal component from one of a DBH location and an A-GPS location, but having a vertical component from the other positioning technology. For instance, a DBH location may have a horizontal uncertainty of 15 meters and a vertical uncertainty of 60 meters, while an A-GPS location may have a horizontal uncertainty of 25 meters and a vertical uncertainty of 10 meters. In such an example, a location report may be generated with a location indicating the horizontal coordinates related to the DBH location and the vertical coordinated related to the A-GPS location based on their lower respective uncertainty values.

In certain aspects, E911 methods, computer-readable media, and systems are provided that take into account the uncertainty value associated with a UE's DBH and A-GPS location. In a first aspect of the present invention, a method is provided. In embodiments, the method comprises a first location received in response to a communication (e.g., call, text, video, etc.) initiated by a UE. The first location may include a DBH location associated with the UE. A second location may be received in response to the communication initiated by the UE. The second location may include an A-GPS location associated with the UE. The first location may be compared to the second location. For example, horizontal and vertical components of the first location may be compared to horizontal and vertical components of the second location. Based on comparing the first location to the second location, a location report may be generated that includes location information for the UE. For example, location information may be expressed in the form of geographical coordinates associated with the DBH location and/or the A-GPS location. A location report that may include location information for the UE that indicates the uncertainty associated with horizontal and vertical components of a DBH or A-GPS location.

In other embodiments, one or more computer-readable media having computer-executable instructions embodied thereon that, when executed, perform a method for sending an Enhanced 911 (E911) location report. The method may comprise receiving a first location in response to a communication initiated by a UE, wherein the first location is a DBH location associated with the UE. In some embodiments, the DBH location may have a DBH horizontal component of the first location and/or a DBH vertical component of the first location. The method may comprise receiving a second location in response to the communication initiated by the UE, wherein the second location is an A-GPS location associated with the UE. In some embodiments, the A-GPS location may include an A-GPS horizontal component of the second location and/or an A-GPS vertical component of the second location. The method may further comprise, comparing the first location to the second location and generating, based on comparing the first location to the second location, a location report that includes location information for the UE.

In still other embodiments, a system for generating an enhanced 911 (E911) location report comprising one or more processors configured to execute operations comprising receiving a first location in response to a communication initiated by a UE, wherein the first location includes a first uncertainty value. For example the first location may include a horizontal uncertainty value and/or a vertical uncertainty value. The operations may further comprise receiving a second location in response to the communication initiated by the UE, wherein the second location includes a second uncertainty value. The operations may comprise comparing the first uncertainty value to the second uncertainty value to determine a lower uncertainty value. A location report may be generated based on determining the lower uncertainty value, the location report including the first location or the second location.

Figure 1:
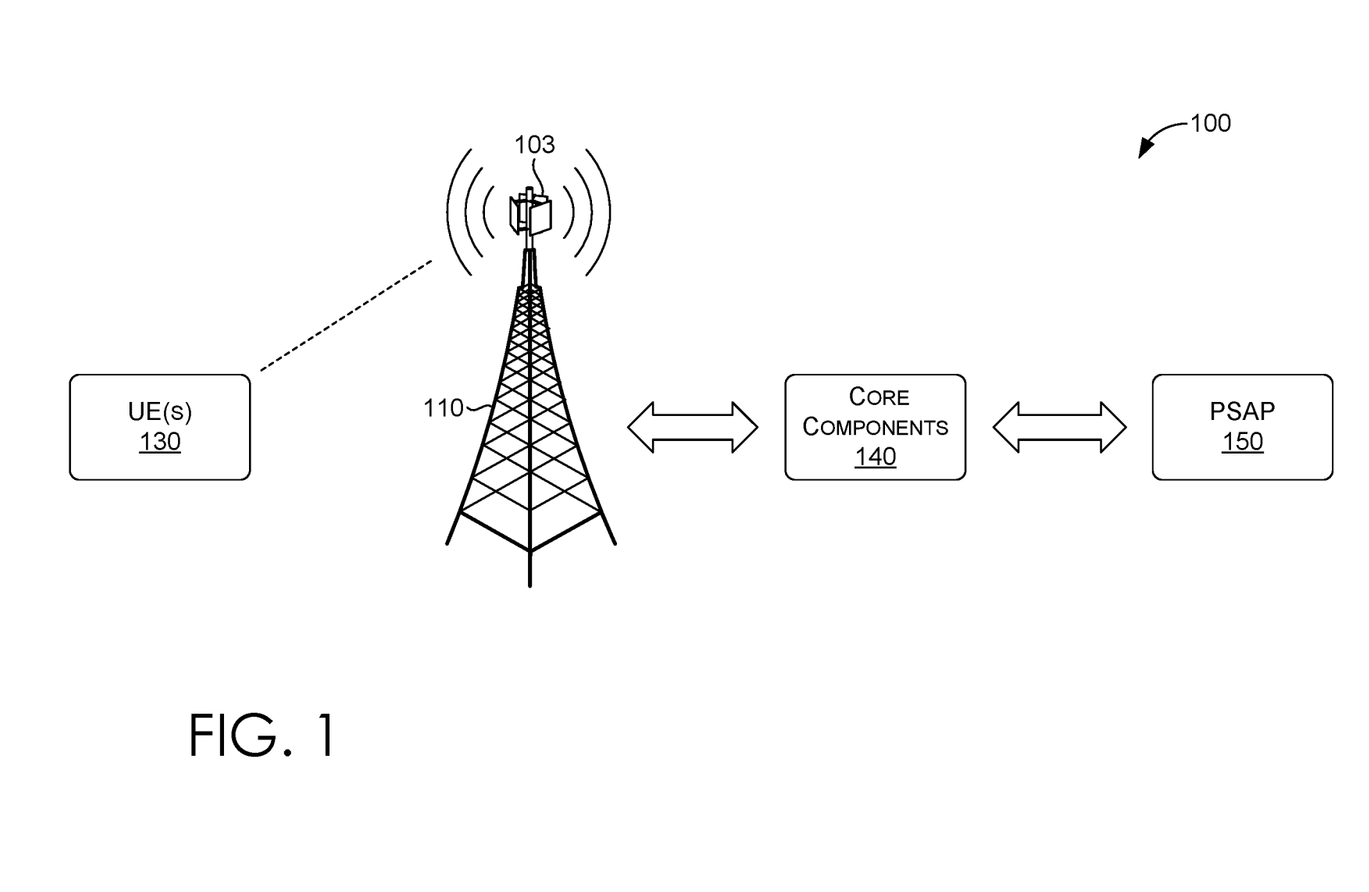
FIG. 1 depicts a diagram of an exemplary network environment in which implementations of the present disclosure may be employed.

Turning now to FIG. 1, network environment 100 is an exemplary network environment in which implementations of the present disclosure may be employed. Network environment 100 is one example of a suitable network environment and is not intended to suggest any limitation as to the scope of use or functionality of the present disclosure. Neither should the network environment be interpreted as having any dependency or requirement relating to any one or combination of components illustrated.

The network environment 100 provides service to one or more UE(s) 130, such as E911 services. In some embodiments, the network environment 100 may be a telecommunication network (e.g., a telecommunication network such as, but not limited to, a wireless telecommunication network), or portion thereof. The network environment 100 may include one or more devices and components, such as base stations, servers, switches, relays, amplifiers, databases, nodes, etc. which are not shown so as to not confuse other aspects of the present disclosure. Those devices and components may provide connectivity in a variety of implementations. In addition, the network environment 100 may be utilized in a variety of manners, such as a single network, multiple networks, or as a network of networks, but, ultimately, is shown as simplified as possible to avoid the risk of confusing other aspects of the present disclosure.

The network environment 100 may include or otherwise may be accessible through a cell site 110. The cell site 110 may include one or more antennas 103, base transmitter stations, radios, transmitter/receivers, digital signal processors, control electronics, GPS equipment, power cabinets or power supply, base stations, charging stations, etc. such that the cell site 110 may provide a communication link between the one or more UE(s) 130 and other components, systems, equipment, and/or devices of the network environment 100. The base station and/or a computing device (e.g., whether local or remote) associated with the base station may manage or otherwise control the operations of components of the cell site 110. Network environment 100 may also include core components 140 one or more of which interface with cell site 110 and/or PSAP 150.

In some embodiments, one or more UE(s) 130 may take the form of one or more wireless or mobile devices capable of communication via the network environment 100. For example, one or more UE(s) 130 may take the form of one or more mobile devices capable of communication via a telecommunication network such as, but not limited to, a wireless telecommunication network. In this regard, UE(s) 130 may be any mobile computing device that communicates by way of a network, for example, a 3G, CDMA, 4G, LTE, WiMAX, 5G, 6G or any other type of network.

As used herein, user equipment (UE) (also referenced herein as a user device or UE device) can include any device employed by an end-user to communicate with a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 800 described herein with respect to FIG. 8.

The network environment 100 in certain embodiments may be structured to connect subscribers to a service provider or a plurality of service providers. Alternatively or additionally, the network environment 100 may be associated with a specific telecommunication provider that provides services (e.g. 5G, voice, location, etc.) to one or more UE(s) 130. For example, the user devices 130 may be subscribers to a telecommunication service provider, in which the user devices are registered or subscribed to receive voice and data services over the network environment 100. The network environment 100 may include any communication network providing voice and/or data service(s), such as, for example, a 1x circuit voice, a 3G network (e.g., CDMA, CDMA 2000, WCDMA, GSM, UMTS, a 4G network (LTE, WiMAX, HSDPA), 5G, or a 6G network.

Having described network environments 100 and components operating therein, it will be understood by those of ordinary skill in the art that the network environment 100 is but an example of a suitable network and is not intended to limit the scope of use or functionality of aspects described herein. Similarly, network environment 100 should not be interpreted as imputing any dependency and/or any requirements with regard to each component and combination(s) of components illustrated in FIG. 1. It will be appreciated by those of ordinary skill in the art that the number, interactions, and physical location of components illustrated in FIG. 1 is an example, as other methods, hardware, software, components, and devices for establishing one or more communication links between the various components may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular components or may be represented in a particular quantity in FIG. 1 it will be appreciated that some aspects may include a plurality of devices and/or components such that FIG. 1 should not be considered as limiting the quantity of any device and/or component.

Figure 2:
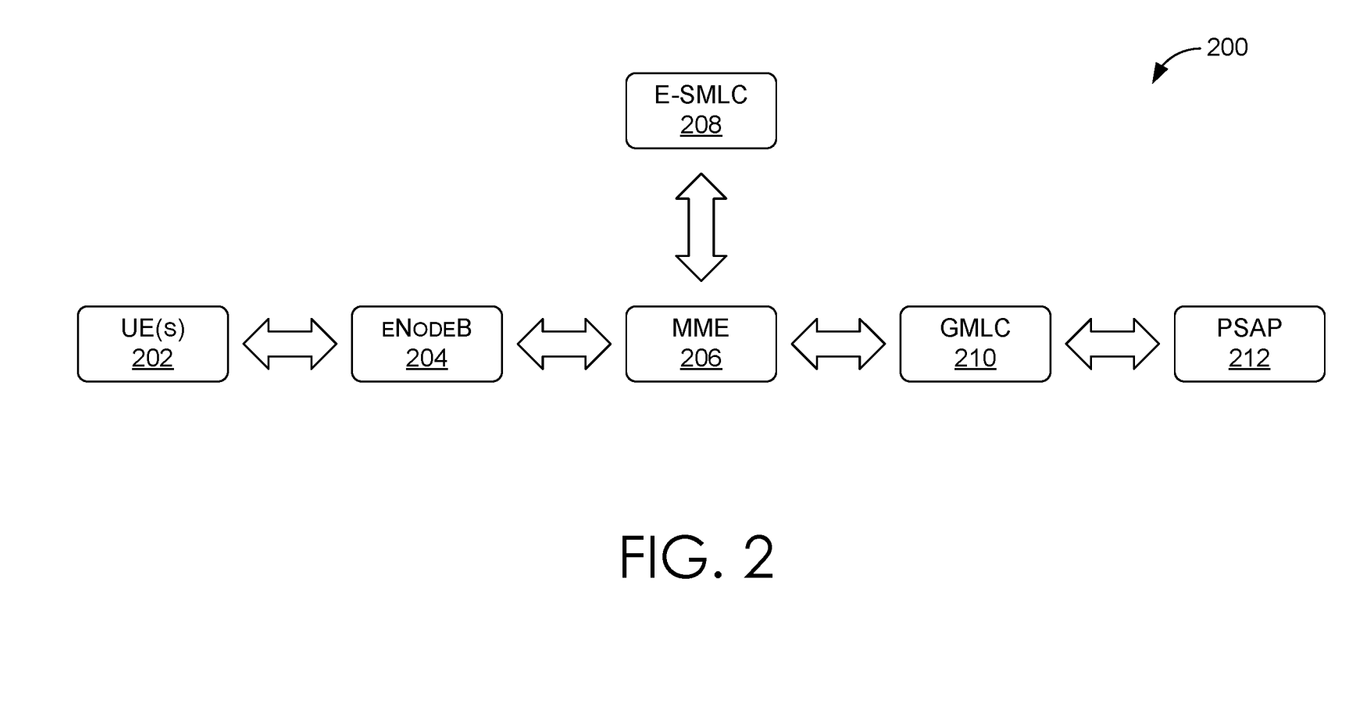
FIG. 2 depicts an example of a 4G network environment in accordance with embodiments of the present disclosure.

FIG. 2 depicts a more detailed example of network environment 100 in accordance with embodiments of the present disclosure. More particularly, FIG. 2 illustrates a 4G network environment 200 in accordance with embodiments of the present disclosure. Network environment 200 may include various 4G core components of a cellular network one or more of which may interface with PSAP 212. Network environment 200 may include one or more UE(s) 202; 4G cell site components, such as eNodeB 204; and 4G core components, such as Mobile Management Entity (MME) 206, Enhanced Serving Mobile Location Center (E-SMLC) 208, and Gateway Mobile Location Center (GMLC) 210.

Figure 3:
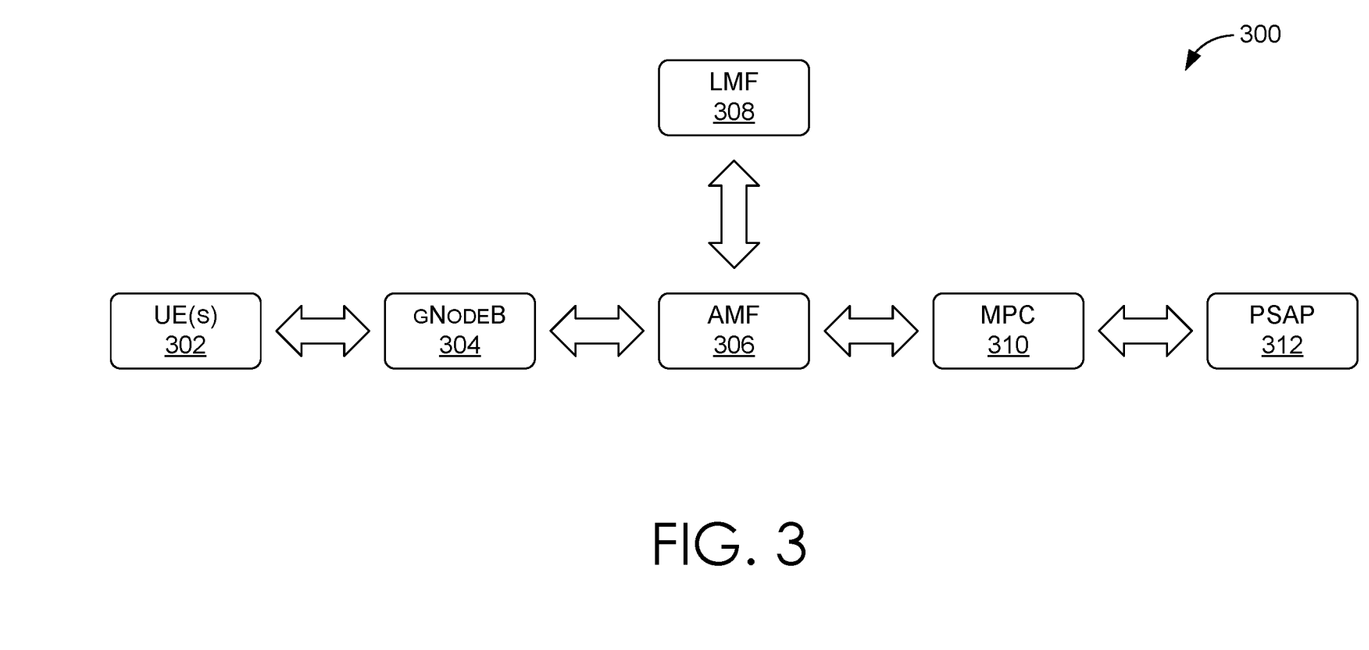
FIG. 3 depicts an example of a 5G network environment in accordance with embodiments of the present disclosure, in accordance with aspects herein.

FIG. 3 illustrates a more detailed example of network environment 100 in accordance with embodiments of the present disclosure. More particular, FIG. 3 illustrates a 5G network environment 300 in accordance with embodiments of the present disclosures. Network environment 300 may include various 5G core components of a cellular network one or more of which may interface with PSAP 312. Network environment 300 may include one or more UE(s) 302; 5G cell site components, such as gNodeB 304; and 5G core components, such as Access & Mobility Management Function (AMF) 306, Location Management Function (LMF) 308, and Mobile Positioning Center (MPC) 310.

Figure 4:
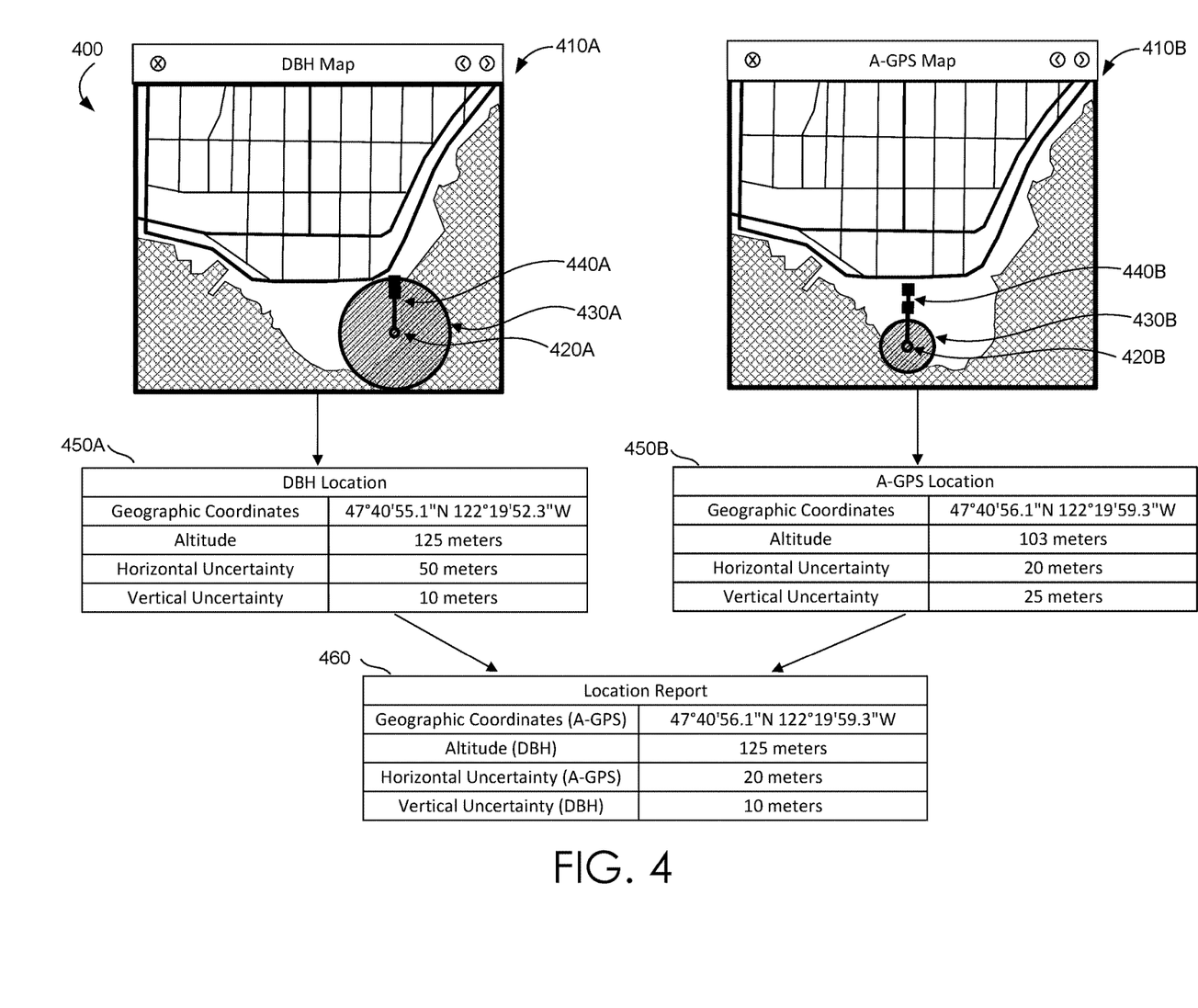
FIG. 4 depicts an example graphical user interface (GUI) for uncertainty based selection for location reporting in E911 systems, in accordance with aspects herein.

FIG. 4 depicts an example graphical user interface (GUI) 400 for uncertainty based selection for location reporting in E911 systems, in accordance with implementation of the present disclosure. The GUI 400 may include one or more graphical elements depicting a geographic area, such as maps 410A and 410B. Maps 410A and 410B may be generated as part of a Geographic Information System (GIS), aerial and/or satellite imaging, or any suitable method for depicting a geographic area. In some examples, the maps 410A and 410B may include information such as street names, addresses, building labels, and/or any other information. The maps may correspond to location information received from a positioning system. For example, map 410 corresponds to a DBH location and map 410B corresponds to an A-GPS location.

The maps 410A and 410B may include an indication of an estimated UE location associated with a UE device such as UE locations 420A and 420B. In some embodiments, UE locations, such as UE locations 420A and 420B, may be associated with a UE device that has initiated a communication, such as a call from a caller seeking emergency services. In some embodiments, the UE locations may be depicted as a single point on a map that indicates the estimated location of the associated UE device. In the same or additional embodiments, the UE location may be depicted in the map as an area that may indicate a possible search area such as UE horizontal uncertainty regions 430A and 430B. For example, based on the horizontal uncertainty value of the DBH location received in association with a UE, map 410A may depict the UE location 420A with UE horizontal uncertainty region 430A generated to reflect the DBH horizontal uncertainty value of 50 meters. As another example, map 410B depicts a UE location 420B in a different location from UE location 410A with respect to their relative maps 410A and 410B, but depicted with a smaller UE horizontal uncertainty region 430B due to a lower horizontal uncertainty value of 20 meters associated with the A-GPS location measurement. The GUI 400 may include a number of graphical elements that indicate the location of a UE device and associated information.

The GUI 400 may include indication of a vertical component of UE locations 420A and 420B associated with a search area defined by the vertical uncertainty of the DBH locations and the A-GPS locations. For example UE vertical position indicators 440A and 440B may indicate the altitude of the DBH location and the A-GPS location respectively. The UE vertical position indicators 440A and 440B may indicate the associated vertical uncertainty values. For example the UE vertical position indicator 440A indicates a vertical uncertainty value of 10 meters associated with the DBH based location. As another example, the UE vertical position indicator 440B indicates a vertical uncertainty value of 25 meters associated with the A-GPS based location.

The GUI 400 may also comprise an indication of information associated with a DBH location and/or A-GPS location, such as DBH location information 450A and A-GPS location information 450B. Information associated with a DBH and/or A-GPS locations may comprise parameters, values, and/or any other relevant information associated with an estimated location of a UE. For example, the DBH location information 450A depicts values for geographic coordinates, altitude, and a horizontal uncertainty value and vertical uncertainty value associated with the geographic coordinates and altitude respectively. Similarly, For example, the A-GPS location information 450B depicts values for geographic coordinates, altitude, and a horizontal uncertainty value and vertical uncertainty value associated with the geographic coordinates and altitude respectively. The information presented in the DBH location information 450A and the A-GPS location information 450B may be presented in a location report, such as location report 460 described below. For example, information indicated in the DBH location information 450A and the A-GPS location information 450B may be presented in location report 460 based on the vertical and/or horizontal uncertainty values associated with the DBH location information 450A and the A-GPS location information 450B.

As discussed above, one or more location reports may be generated. For example, location report 460 may be generated. In some embodiments, location reports may be generated in association to other graphical elements such as maps 410A and 410B. In some embodiments, the location report is generated to include location information for a UE device. In some examples, the location report may include information such as geographic coordinates, altitude, uncertainty values, and/or civic address. In certain embodiments, the contents of a location report may be determined based on satisfying certain criteria, such as the uncertainty value of a DBH location and/or an A-GPS location associated with a UE device. For example, location report 460 includes values for altitude and geographic coordinates. The uncertainty values of the horizontal and vertical components of the DBH location and the A-GPS locations may be compared to determine the contents of the location report 460. The contents of the location report 460 may be selects based on determining the lowest of one or more uncertainty values. For example, the location report 460 may include the geographic coordinates corresponding to the A-GPS location since the horizontal uncertainty value of the A-GPS location is less than the horizontal uncertainty value of the DBH location. Similarly, the location report 460 may include the altitude corresponding to the DBH location since the vertical uncertainty value of the DBH location is less that the vertical uncertainty value of the A-GPS location. In some embodiments the location report 460 may be transmitted to a PSAP.

Figure 5:
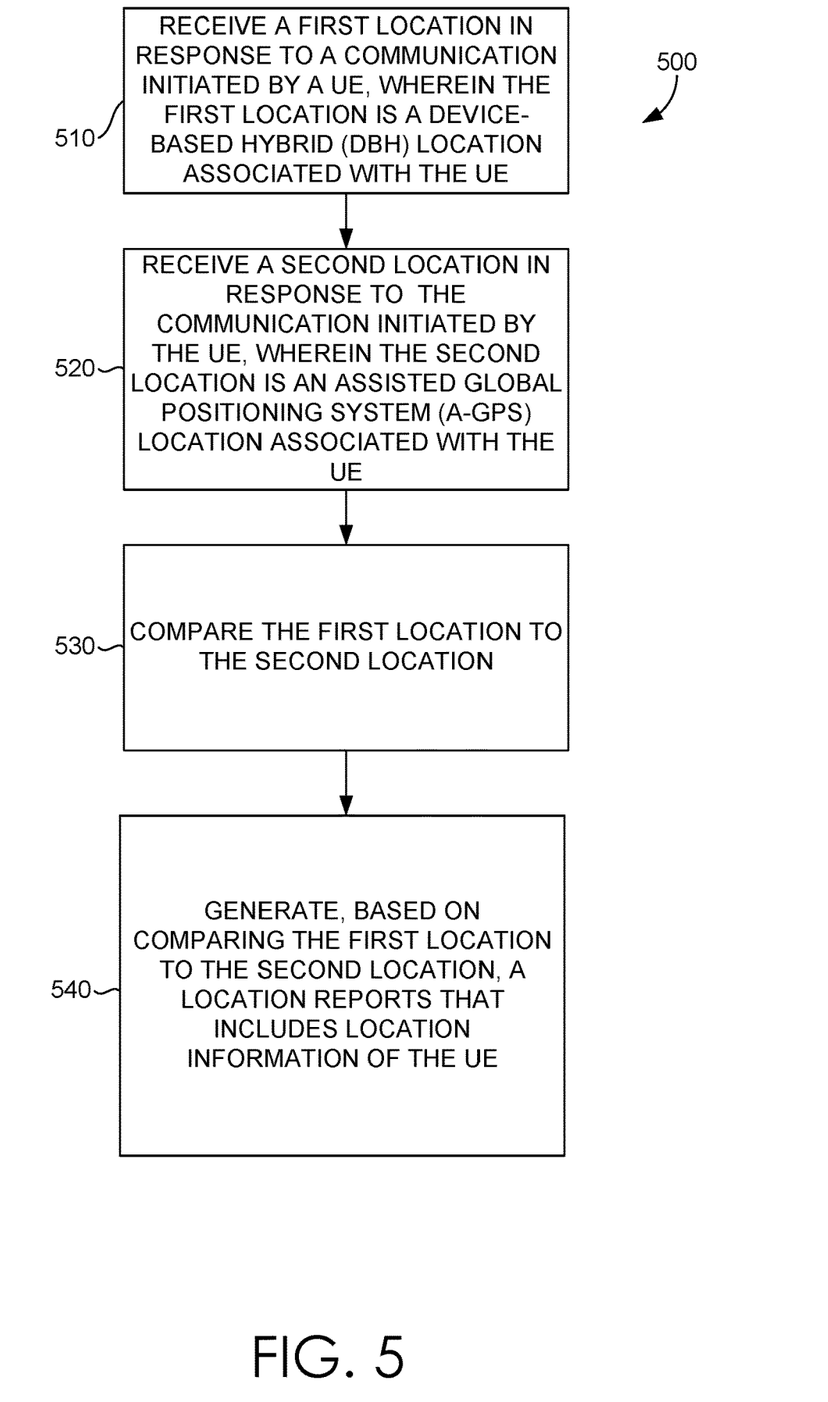
FIG. 5 depicts a flow chart of a method for uncertainty based selection for location reporting in E911 systems, in accordance with aspects of the present disclosure.

FIG. 5 is a flow chart illustrating an example method 500 for uncertainty-based selection of location reporting in E911 systems. It should be understood that while FIG. 5 depicts just one particular arrangement and/or order of steps, other arrangements and/or orders of steps are possible and contemplated by the disclosed herein. For instance, one or more of the steps depicted in FIG. 5, may be performed in a different order or otherwise omitted.

At step 510 of the method 500, a first location may be received in response to a communication initiated by a UE, such as UE(s) 130 of FIG. 1. For example, when a UE user places an emergency call and/or text message, the UE may send an emergency attach request to the MME in the case of a 4G implementation and to the AMF in the case of a 5G implementation, which is forwarded to the GMLC in the case of a 4G implementation and the MPC in the case of a 5G implementation. The GMLC in the case of a 4G implementation and the MPC in the case of a 5G implementation may send a location request to the MME in the case of the 4G implementation and the AMF in the case of the 5G implementation, which is forwarded to the E-SMLC in the case of the 4G implementation and the LMF in the case of the 5G implementation. In response to the location request, the E-SMLC in the case of the 4G implementation and the LMF in the case of the 5G implementation may communicate with the UE via the MME in the case of the 4G implementation and the AMF in the case of the 5G implementation to obtain location information for the UE. In response, the UE may successfully provide its location information in the form of a DBH location to the E-SMLC in the case of the 4G implementation and the LMF in the case of the 5G implementation via the MME in the case of the 4G implementation and the AMF in the case of the 5G implementation. The DBH location information for the UE may be derived from a mix of location methods including crowd-sourced WiFi, Assisted Global Navigation Satellite System (A-GNSS), and UE-based sensors. In addition, the DBH location information for the UE may include an associated uncertainty estimate reflective of the quality of the estimated location of the UE. For example, the DBH location may include a horizontal uncertainty corresponding to a horizontal component of the DBH location and/or a vertical uncertainty corresponding to a vertical component of the DBH location. As another example, the DBH location may include a horizontal uncertainty value indicative of uncertainty in the horizontal footprint and/or a vertical or altitude uncertainty indicative of uncertainty in an altitude measurement of the DBH location.

At step 520 of method 500, a second location may be received in response to a communication initiated by a UE, such as UE(s) 130 of FIG. 1. For example, when a UE user places an emergency call and/or text message, the UE may send an emergency attach request to the MME in the case of a 4G implementation and to the AMF in the case of a 5G implementation, which is forwarded to the GMLC in the case of a 4G implementation and the MPC in the case of a 5G implementation. The GMLC in the case of a 4G implementation and the MPC in the case of a 5G implementation may send a location request to the MME in the case of the 4G implementation and the AMF in the case of the 5G implementation, which is forwarded to the E-SMLC in the case of the 4G implementation and the LMF in the case of the 5G implementation. In response to the location request, the E-SMLC in the case of the 4G implementation and the LMF in the case of the 5G implementation may communicate with the UE via the MME in the case of the 4G implementation and the AMF in the case of the 5G implementation to obtain location information for the UE. In response, the UE may successfully provide its location information in the form of an A-GPS location to the E-SMLC in the case of the 4G implementation and the LMF in the case of the 5G implementation via the MME in the case of the 4G implementation and the AMF in the case of the 5G implementation. The A-GPS location information for the UE may be derived from positional information associated with a satellite positioning system such as GPS and using satellite orbital information obtained from one or more data networks. In addition, the A-GPS location information for the UE may include an associated uncertainty estimate reflective of the quality of the estimated location of the UE. For example, the A-GPS location may include a horizontal uncertainty corresponding to a horizontal component of the A-GPS location and/or a vertical uncertainty corresponding to a vertical component of the A-GPS location. As another example, the A-GPS location may include a horizontal uncertainty value indicative of uncertainty in the horizontal footprint and/or a vertical or altitude uncertainty indicative of uncertainty in an altitude measurement of the A-GPS location.

At step 530 of method 500, the first location is compared to the second location. In some embodiments, the first location may be the DBH location received in step 510 and the second location may be the A-GPS location received in step 520. The various components of the first and second locations may be compared. For example, the horizontal uncertainty value associated with the first location (e.g., DBH location) may be compared to the horizontal uncertainty value associated with the second location (e.g., A-GPS location). Similarly, the vertical uncertainty value associated with the first location may be compared to the vertical uncertainty value associated with the second location. In some embodiments, the lowest of one or more uncertainty values may be determined. For example, the horizontal uncertainty of the first location may be compared to the horizontal uncertainty of the second location to determine the lower uncertainty value. In some embodiments the first location or the second location may lack a horizontal and/or vertical component. In such an embodiment, the available horizontal and/or vertical components of the first or second location may be selected as the lowest uncertainty value. For example, if a horizontal component of a location method is unavailable, the vertical component of the location method may be excluded, and the horizontal component and/or the vertical component of the other location may be selected.

At step 540 of the method 500, a location report is generated based on comparing the first location to the second location. In some embodiments, the location report may include some portion of location information from the UE device. For example, if the uncertainty value associated with the DBH location from the UE is determined to be lower that the uncertainty value associated with the A-GPS location from the UE, the location provided by the DBH location may be included in a location report. In some embodiments the E-SMLC and/or the MME in the case of a 4G implementation or the LMF and/or the AMF in the case of a 5G implementation may send a location report to the GMLC in the case of the 4G implementation and the MPC in the case of a 5G implementation including the location information associated with the UE. The GMLC in the case of a 4G implementation and the MPC in the case of the 5G implementation may then then send this location report to PSAP. The location report may include information associated with UE(s) 130 of FIG. 1. In certain aspects the location information for the UE comprises a horizontal and/or vertical coordinates such as latitude/longitude and altitude respectively. In some embodiments, the contents of the location report may be based on the DBH location and the A-GPS location received from a UE device. For example, the location report may include the vertical component of the DBH location and the horizontal component of the A-GPS location. In other examples, the location report may include the horizontal component of both the DBH location and the A-GPS location. The location report having any combination of the various components of the DBH location and the A-GPS location is contemplated herein.

Figure 6:
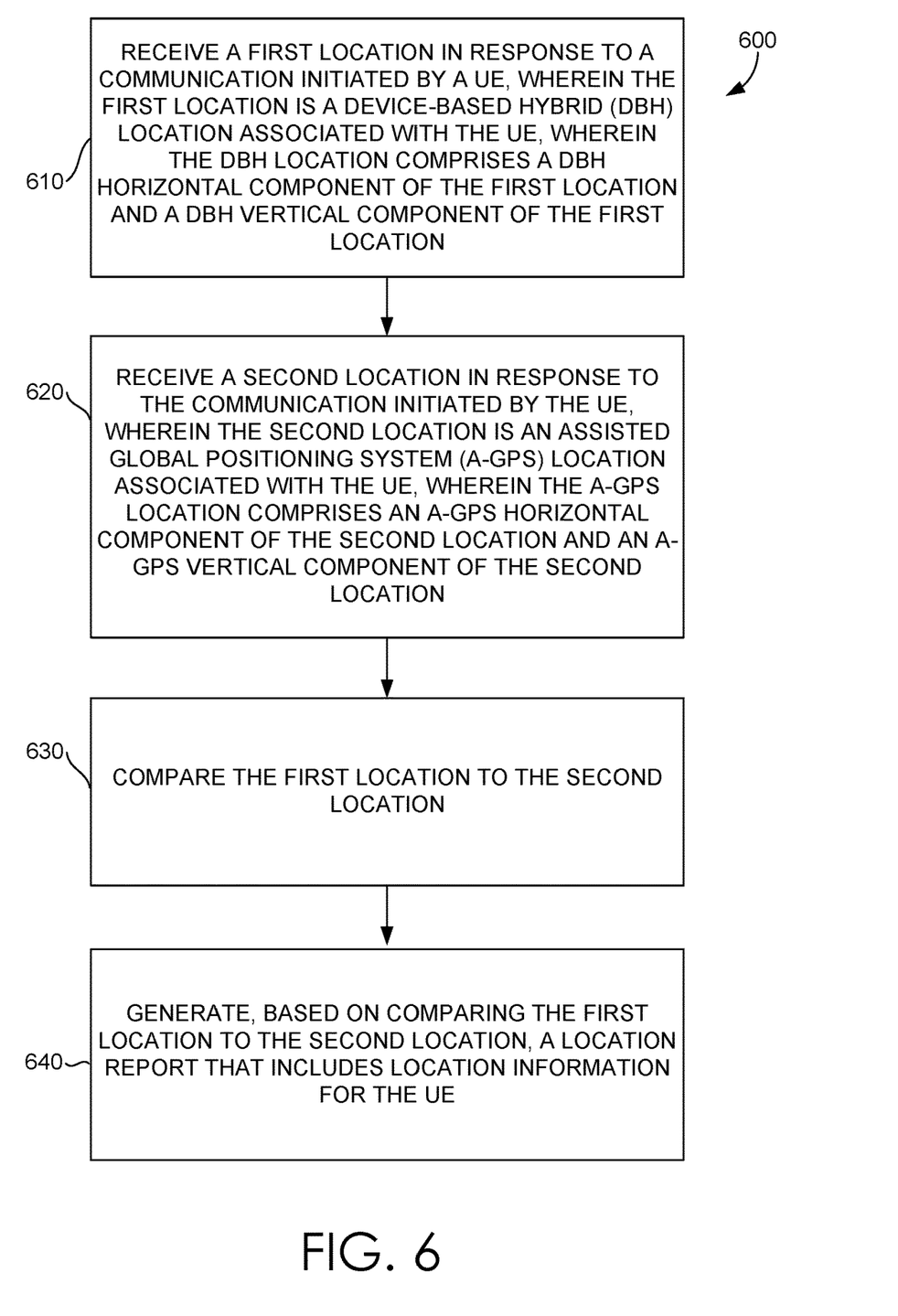
FIG. 6 depicts a flow chart of a method for uncertainty based selection for location reporting in E911 systems, in accordance with aspects of the present disclosure.

FIG. 6 is a flow chart illustrating an example method 600 for uncertainty-based selection for location reporting in E911 systems. In step 610 of method 600, a first location may be received in response to a communication initiated by a UE, such as UE(s) 130 of FIG. 1. For example, when a UE user places an emergency call. In response to the communication, the UE may provide the first location in the form of a DBH location that may be derived from a mix of location methods. In some embodiments, the first location may comprise a DBH horizontal component of the first location and/or a DBH vertical component of the first location. For example, the first location may include longitude and latitude coordinates associated with a DBH location as the DBH horizontal component of the first location. In some examples, the first location may include an altitude value associated with a DBH location as a DBH vertical component of the first location.

In step 620 of method 600, a second location may be received in response to a communication initiated by a UE, such as UE(s) 130 of FIG. 1. For example, when a UE user places an emergency call. In response to the communication, the UE may provide the second location in the form of an A-GPS location. In some embodiments, the second location may comprise an A-GPS horizontal component of the second location and/or an A-GPS vertical component of the second location. For example, the second location may include longitude and latitude coordinates associated with an A-GPS location as the a-GPS horizontal component of the second location. In some examples, the second location may include an altitude value associated with an A-GPS location as an A-GPS vertical component of the second location.

At step 630 of method 600, the first location is compared to the second location. In some embodiments, the first location may be the first location received in step 610 and the second location may be the second location received in step 620. The various components (e.g., horizontal, vertical, etc.) of the first and second locations may be compared. In some embodiments, uncertainty of the first and second locations may be compared and/or analyzed. For example, a horizontal uncertainty value associated with the first location (e.g., DBH location) may be compared to a horizontal uncertainty value associated with the second location (e.g., A-GPS location). Similarly, a vertical uncertainty value associated with the first location (e.g., DBH location) may be compared to a vertical uncertainty value associated with the second location (e.g., A-GPS location). In some embodiments, the lowest of one or more uncertainty values may be determined. For example, the horizontal uncertainty of the first location may be compared to the horizontal uncertainty of the second location to determine the lower uncertainty value. In some embodiments the first location or the second location may lack a horizontal and/or vertical component. In such an embodiment, the available horizontal and/or vertical components of the other location may be selected as the lowest uncertainty value. For example, if either the horizontal or vertical components of a location method is unavailable, the vertical and horizontal component of another location method may be chosen (e.g. treated as having the lowest uncertainty) independent of the uncertainty values associated with the available components.

At step 640 of the method 600, a location report is generated based on comparing the first location to the second location. In some embodiments, the location report may include some portion of location information from the UE device. For example, if the uncertainty value associated with the DBH location from the UE is determined to be lower that the uncertainty value associated with the A-GPS location from the UE, the location provided by the DBH location may be included in a location report. In some embodiments the E-SMLC and/or the MME in the case of a 4G implementation or the LMF and/or the AMF in the case of a 5G implementation may send a location report to the GMLC in the case of the 4G implementation and the MPC in the case of a 5G implementation including the location information associated with the UE. The GMLC in the case of a 4G implementation and the MPC in the case of the 5G implementation may then send this location report to PSAP. The location report may include information associated with UE(s) 130 of FIG. 1. In certain aspects the location information for the UE comprises a horizontal and/or vertical coordinates such as latitude/longitude and altitude respectively. In some embodiments, the contents of the location report may be based on the DBH location and the A-GPS location received from a UE device. For example, the location report may include the vertical component of the DBH location and the horizontal component of the A-GPS location. In other examples, the location report may include the horizontal component of both the DBH location and the A-GPS location. The location report having any combination of the various components of the DBH location and the A-GPS location is contemplated herein.

Figure 7:
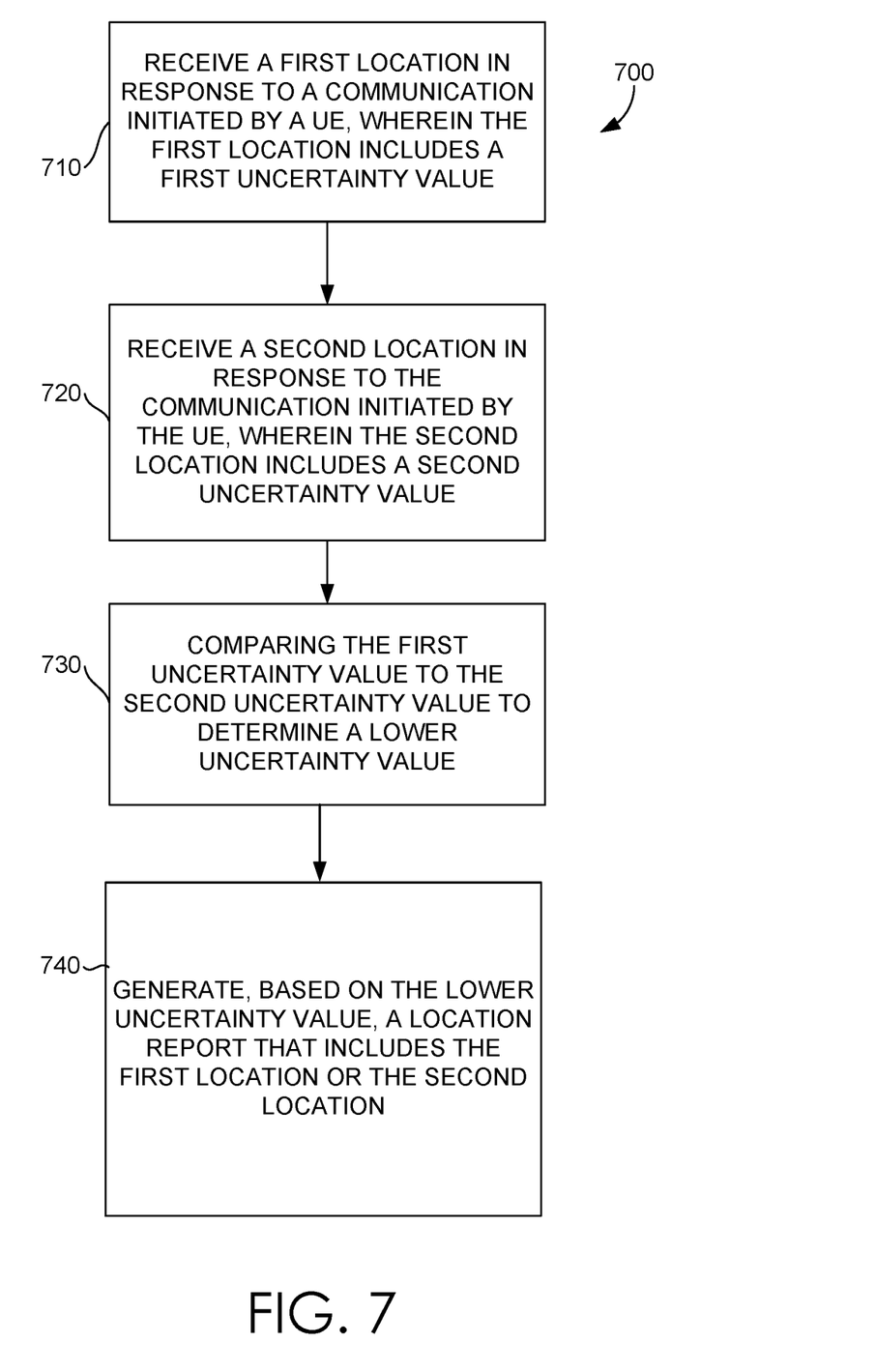
FIG. 7 depicts a flow chart of a method for uncertainty based selection for location reporting in E911 systems, in accordance with aspects of the present disclosure.

FIG. 7 is a flow chart illustrating an example method 700 for uncertainty-based selection for location reporting in E911 systems. At step 710 of the method 700, a first location may be received in response to a communication initiated by a UE, such as UE(s) 130 of FIG. 1. For example, when a UE user places an emergency call and/or text message, the UE may send an emergency attach request to the MME in the case of a 4G implementation and to the AMF in the case of a 5G implementation, which is forwarded to the GMLC in the case of a 4G implementation and the MPC in the case of a 5G implementation. The GMLC in the case of a 4G implementation and the MPC in the case of a 5G implementation may send a location request to the MME in the case of the 4G implementation and the AMF in the case of the 5G implementation, which is forwarded to the E-SMLC in the case of the 4G implementation and the LMF in the case of the 5G implementation. In response to the location request, the E-SMLC in the case of the 4G implementation and the LMF in the case of the 5G implementation may communicate with the UE via the MME in the case of the 4G implementation and the AMF in the case of the 5G implementation to obtain location information for the UE. In response, the UE may successfully provide its location information in the form of a DBH and/or an A-GPS location to the E-SMLC in the case of the 4G implementation and the LMF in the case of the 5G implementation via the MME in the case of the 4G implementation and the AMF in the case of the 5G implementation. In some embodiments, the first location may include a first uncertainty value. For example, the first location may be in the form of a DBH location that may include a horizontal uncertainty corresponding to a horizontal component of the DBH location and/or a vertical uncertainty corresponding to a vertical component of the DBH location. As another example, the first location may be in the form of an A-GPS location that may include a horizontal uncertainty corresponding to a horizontal component of the A-GPS location and/or a vertical uncertainty corresponding to a vertical component of the A-GPS location.

At step 720 of the method 700, a second location may be received in response to the communication initiated by a UE, such as UE(s) 130 of FIG. 1. For example, when a UE user places an emergency call and/or text message, the UE may provide its location information in the form of a DBH and/or an A-GPS location to the E-SMLC in the case of the 4G implementation and the LMF in the case of the 5G implementation via the MME in the case of the 4G implementation and the AMF in the case of the 5G implementation. In some embodiments, the second location may include a second uncertainty value. For example, the second location may be in the form of a DBH location that may include a horizontal uncertainty corresponding to a horizontal component of the DBH location and/or a vertical uncertainty corresponding to a vertical component of the DBH location. As another example, the second location may be in the form of an A-GPS location that may include a horizontal uncertainty corresponding to a horizontal component of the A-GPS location and/or a vertical uncertainty corresponding to a vertical component of the A-GPS location.

At step 730 of method 700, the first uncertainty value is compared to the second uncertainty value. In some embodiments, the first uncertainty value is received in step 710 and the second uncertainty value may be received in step 720. The various components (e.g., horizontal, vertical, etc.) of the first and second uncertainty values may be compared. For example a vertical uncertainty value associated with the first uncertainty value (e.g., DBH vertical uncertainty) may be compared to a vertical uncertainty value associated with the second uncertainty value (e.g., A-GPS vertical uncertainty). Similarly, a horizontal uncertainty value associated with the first uncertainty value may be compared to a horizontal uncertainty value associated with the second uncertainty value. In some embodiments, the lowest of one or more uncertainty values may be determined. For example, the horizontal uncertainty of the first uncertainty value may be compared to the horizontal uncertainty of the second uncertainty value to determine the lower horizontal uncertainty value. In some embodiments the first uncertainty value or the second uncertainty value may lack a horizontal and/or vertical component. In such an embodiment, the vertical and horizontal components associated with the other uncertainty value may be selected even though the uncertainty values associated with the available components may be higher. Thus, the available horizontal and/or vertical components of the first or second uncertainty values may be selected as the lowest uncertainty value.

At step 740 of the method 700, a location report is generated based on determining the lower uncertainty value of the first uncertainty value and the second uncertainty value. In some embodiments, the location report may include the first location received from a UE or the second location received from the UE. For example, if the uncertainty value associated with the first location from the UE is determined to be lower that the uncertainty value associated with the second location from the UE, the location provided by the first location may be included in a location report. In some embodiments the E-SMLC and/or the MME in the case of a 4G implementation or the LMF and/or the AMF in the case of a 5G implementation may send a location report to the GMLC in the case of the 4G implementation and the MPC in the case of a 5G implementation including the location information associated with the UE. The GMLC in the case of a 4G implementation and the MPC in the case of the 5G implementation may then then send this location report to PSAP. The location report may include information associated with UE(s) 130 of FIG. 1. In certain aspects the first location and/or second location comprise a horizontal and/or vertical coordinates, such as latitude/longitude and altitude respectively. In some embodiments, the contents of the location report may be based on a DBH location and an A-GPS location received from a UE device. For example, the location report may include the vertical component of a DBH location and the horizontal component of an A-GPS location. In other examples, the location report may include the horizontal component of both a DBH location and an A-GPS location. The location report having any combination of the various components of a DBH location and an A-GPS location is contemplated herein.

Figure 8:
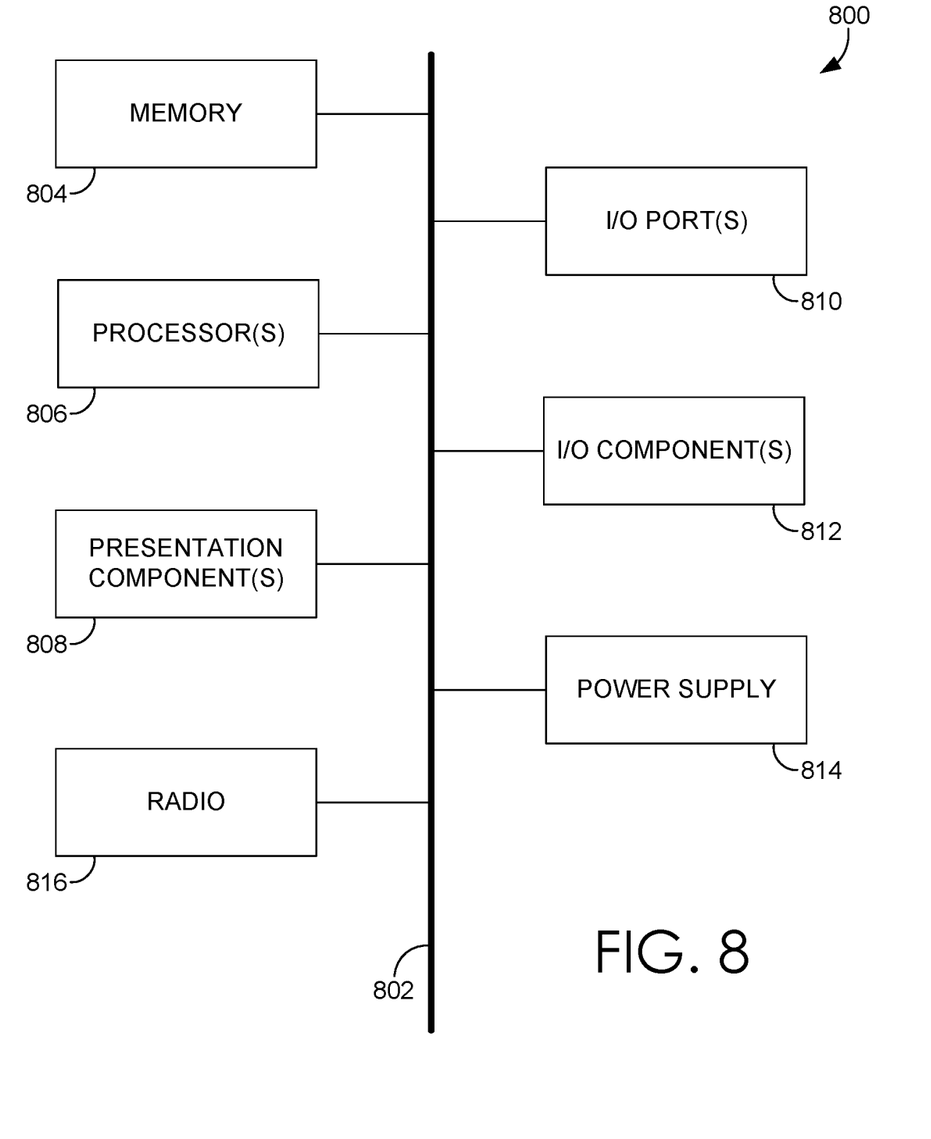
FIG. 8 depicts a diagram of an exemplary computing environment suitable for use in implementations of the present disclosure.

Referring now to FIG. 8, a diagram is depicted of an exemplary computing environment suitable for use in implementations of the present disclosure. In particular, the exemplary computer environment is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 8, computing device 800 includes bus 802 that directly or indirectly couples the following devices: memory 804, one or more processors 806, one or more presentation components 808, input/output (I/O) ports 810, I/O components 812, power supply 814 and radio(s) 816. Bus 802 represents what may be one or more busses (such as an address bus, data bus, or combination thereof). Although the devices of FIG. 8 are shown with lines for the sake of clarity, in reality, delineating various components is not so clear, and metaphorically, the lines would more accurately be grey and fuzzy. For example, one may consider a presentation component, such as a display device to be one of I/O components 812. Also, processors, such as one or more processors 806, have memory. The present disclosure hereof recognizes that such is the nature of the art, and reiterates that FIG. 8 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 8 and refer to "computer" or "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data.

Computer storage media includes RAM, ROM, EEPROM, flash memory or other memory technology, CD-ROM, DVD or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal, such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media such as acoustic, RF, infrared, and other wireless media. Combinations of any of the above should also be included within the scope of computer-readable media.

Memory 804 includes computer-storage media in the form of volatile and/or nonvolatile memory. Memory 804 may be removable, non-removable, or a combination thereof. Exemplary memory includes solid-state memory, hard drives, optical-disc drives, etc. Computing device 800 includes one or more processors 806 that read data from various entities, such as bus 802, memory 804, or I/O components 812. One or more presentation components 808 presents data indications to a person or other device. Exemplary one or more presentation components 808 include a display device, speaker, printing component, vibrating component, etc. I/O ports 810 allow computing device 800 to be logically coupled to other devices, including I/O components 812, some of which may be built in computing device 800. Illustrative I/O components 812 include a microphone, joystick, game pad, satellite dish, scanner, printer, wireless device, etc.

Radio 816 represents a radio that facilitates communication with a wireless telecommunications network. Illustrative wireless telecommunications technologies include CDMA, GPRS, TDMA, GSM, and the like. Radio 816 might additionally or alternatively facilitate other types of wireless communications including Wi-Fi, WiMAX, LTE, or other VOIP communications. As can be appreciated, in various embodiments, radio 816 can be configured to support multiple technologies and/or multiple radios can be utilized to support multiple technologies. A wireless telecommunications network might include an array of devices, which are not shown so as to not obscure more relevant aspects of the invention. Components, such as a base station, a communications tower, or even access points (as well as other components), can provide wireless connectivity in some embodiments.

Many different arrangements of the various components depicted, as well as components not shown, are possible without departing from the scope of the claims below. Embodiments of this technology have been described with the intent to be illustrative rather than be restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. An Enhanced 911 (E911) method, the method comprising:
   receiving a first location including a first horizontal component in response to a communication initiated by a UE, wherein the first location is a device-based hybrid (DBH) location associated with the UE;
   receiving a second location including a second horizontal component in response to the communication initiated by the UE, wherein the second location is an assisted global positioning system (A-GPS) location associated with the UE;

comparing the first horizontal component to the second horizontal component; and generating, based on comparing the first horizontal component to the second horizontal component, a location report that includes the second horizontal component based on the second horizontal component having a lower horizontal uncertainty value than the first horizontal component.

2. The method of claim 1, wherein the first location comprises a DBH horizontal uncertainty value corresponding to the first horizontal component of the first location, and wherein the second location comprises an A-GPS horizontal uncertainty value corresponding to the second horizontal component of the second location, and wherein the location report is generated based on comparing the DBH horizontal uncertainty value to the A-GPS horizontal uncertainty value.

3. The method of claim 1, wherein the lower horizontal uncertainty value corresponds to a radius associated with a latitude and a longitude for the UE.

4. The method of claim 1, wherein the first location comprises a DBH vertical uncertainty value corresponding to a vertical component of the first location, and wherein the second location comprises an A-GPS vertical uncertainty value corresponding to a vertical component of the second location, the method further comprising:
comparing the DBH vertical uncertainty value to the A-GPS vertical uncertainty value; and
including the vertical component that has a lower vertical uncertainty in the location report.

5. The method of claim 4, further comprising:
determining the DBH vertical uncertainty value is lower than the A-GPS vertical uncertainty value; and
including the vertical component of the first location in the location report.

6. The method of claim 5, wherein the vertical component of the first location is an altitude value, and wherein the DBH vertical uncertainty value is included in the location report.

7. The method of claim 1, wherein the location report includes the lower horizontal uncertainty value.

8. The method of claim 1, further comprising, sending the location report to a Public Safety Answering Point (PSAP).

9. One or more computer-readable media having computer-executable instructions embodied thereon that, when executed, perform a method for sending an Enhanced 911 (E911) location report, the method comprising:
receiving a first location in response to a communication initiated by a UE, wherein the first location is a device-based hybrid (DBH) location associated with the UE, wherein the DBH location comprises a DBH horizontal component of the first location and a DBH vertical component of the first location;
receiving a second location in response to the communication initiated by the UE, wherein the second location is an assisted global positioning system (A-GPS) location associated with the UE, wherein the A-GPS location comprises a A-GPS horizontal component of the second location and a A-GPS vertical component of the second location;
comparing the DBH vertical component to the A-GPS vertical component;
comparing the DBH horizontal component to the A-GPS horizontal component; and
generating, based on the comparing, a location report that includes either the DBH vertical component or the A-GPS vertical component and either the DBH horizontal component or the A-GPS horizontal component for the UE.

10. The media or claim 9, wherein comparing the DBH horizontal component to the A-GPS horizontal component comprises determining that the A-GPS horizontal component has a lower horizontal uncertainty value, and wherein the location report includes the A-GPS horizontal component.

11. The media of claim 10, wherein comparing the DBH vertical component to the A-GPS vertical component comprises determining that the A-GPS vertical component has a lower vertical uncertainty value, and wherein the location report includes the A-GPS vertical component.

12. The media of claim 9, wherein comparing the comparing the DBH vertical component to the A-GPS vertical component comprises determining that the DBH vertical component has a lower vertical uncertainty value.

13. The media of claim 12, wherein the location report includes the DBH vertical component based on the lower vertical uncertainty value.

14. The media of claim 9, wherein the location report includes an indication of an uncertainty value associated with the first location or the second location.

15. The media of claim 9, further comprising, sending the location report to a Public Safety Answering Point (PSAP).

16. A system for generating an enhanced 911 (E911) location report, the system comprising one or more processors configured to execute operations comprising:
receiving a first location in response to a communication initiated by a UE, wherein the first location includes a first uncertainty value;
receiving a second location in response to the communication initiated by the UE, wherein the second location includes a second uncertainty value;
comparing the first uncertainty value to the second uncertainty value to determine that the first uncertainty value is a lower uncertainty value than the second uncertainty value; and
generating, based on the lower uncertainty value, a location report that includes a horizontal component from the first location.

17. The system of claim 16, wherein the first location comprises an assisted global positioning system (A-GPS) location.

18. The system of claim 16, wherein the operations further comprise comparing a vertical location uncertainty for a vertical component included in each of the first location and the second location, and generating the location report that includes the vertical component of the second location based on the vertical location uncertainty being lower for the second location.

19. The system of claim 16, wherein the location report includes the indication of the first uncertainty value.

20. The system of claim 16, further comprising, sending the location report to a Public Safety Answering Point (PSAP).

* * * * *